United States Patent [19]

Phillips

[11] Patent Number: 4,626,114
[45] Date of Patent: Dec. 2, 1986

[54] SINGLE TAPERED BUSHING FOR SHAFT MOUNT

[75] Inventor: Allyn E. Phillips, Mason County, Ky.

[73] Assignee: Emerson Electric Co., St. Louis, Mo.

[21] Appl. No.: 778,896

[22] Filed: Sep. 23, 1985

[51] Int. Cl.$^4$ ............................ F16C 43/04; F16B 2/14
[52] U.S. Cl. ..................................... 384/584; 384/538; 403/370
[58] Field of Search ............... 384/538, 537, 584, 585, 384/548; 403/370, 371, 356

[56] References Cited

U.S. PATENT DOCUMENTS

| | | | |
|---|---|---|---|
| 2,033,156 | 3/1936 | Shafer | 384/584 |
| 2,331,498 | 10/1943 | Otto | |
| 2,524,027 | 10/1950 | Blackmarr | |
| 2,634,144 | 4/1953 | Friedman | 403/370 X |
| 2,669,471 | 2/1954 | Breslow | 287/52.06 |
| 2,811,861 | 11/1957 | Rieser | 74/421 |
| 2,849,886 | 9/1958 | McCloskey | 403/370 X |
| 3,257,070 | 6/1966 | Kuklinski | 230/134 |
| 3,368,833 | 2/1968 | Chung | 287/52.06 |
| 3,398,597 | 8/1968 | Chung | 74/421 |
| 3,442,559 | 5/1969 | Horvath et al. | 308/15 |
| 3,590,652 | 7/1971 | Strang | 74/421 |
| 3,677,583 | 7/1972 | Steinke | 287/52.06 |
| 4,304,502 | 12/1981 | Stratienko | 403/371 X |
| 4,338,036 | 7/1982 | DeLeu | 403/16 |
| 4,452,547 | 6/1984 | Thiel et al. | 403/370 |

FOREIGN PATENT DOCUMENTS 121613 7/1946 Australia .

OTHER PUBLICATIONS

American Shaft-King—American Pulley Co., ©19-52—see p. 3.
Browning Gen. Catalog—p. A1—©1981, Split Taper Bushings.
Windrive-Helical Shaft Mount Speed Reducers, Aug. 1982—Winsmith, Div. of UMC Industries.

Primary Examiner—Stuart S. Levy
Assistant Examiner—Thomas R. Hannon
Attorney, Agent, or Firm—Polster, Polster and Lucchesi

[57] ABSTRACT

A single tapered bushing system for receiving and mounting a shaft within a bearing assembly is disclosed. A rotatable quill member having a hollow hub is received by the bearings. The hub has a tapered inner bore. A single sleeve having a flange at one end thereof, a tapered outer surface, and a cylindrical inner bore is received within the hub bore, with the outer tapered surface of the sleeve contacting the tapered hub bore substantially along the full length of the sleeve. A longitudinal slot in the sleeve permits circumferential contraction or expansion of the sleeve within the tapered hub bore. The inner sleeve bore receives a shaft in such manner as to accommodate variations in alignment, concentricity, and parallelism, within a limited range, between the axis of the shaft and the axis of the hub. A key and slot arrangement is provided for rotatably coupling the shaft and the hub. Fasteners forcefully draw the tapered bore of the hub onto the sleeve with the shaft received therein and contract or expand the sleeve on the shaft so as to accommodate the above-noted possible misalignment between the shaft and the hub, and to secure the shaft within the hub.

6 Claims, 5 Drawing Figures

SINGLE TAPERED BUSHING FOR SHAFT MOUNT

BACKGROUND OF THE INVENTION

This invention relates to a single tapered bushing for receiving and mounting a shaft within a rotatable hub so as to permit the shaft to be readily rotatably coupled to the hub and so as to accommodate variations in both concentricity and/or alignment between the shaft axis and the hub axis.

While such a shaft coupling and mounting system, as above-described, may have broad applications, one specific application is to permit a speed reducer, such as a shaft mount speed reducer, to receive a driven or output shaft and to accommodate variations in concentricity and alignment (within a limited range) between the output hub of the speed reducer and the driven shaft of an application to be driven by the speed reducer. Typically, a speed reducer has an input or high speed pinion shaft driven at relatively high rotational speeds by an electric motor or by another prime mover. The speed reducer has a housing which journals the input shaft and which houses and journals a speed-reducing gear train therein. The housing further typically has an output quill which includes a hub, with the quill hub being journaled with respect to the speed-reducing housing, and being driven at reduced speed by the gear train with a consequent increase in torque. The hub typically receives a driven shaft from a particular application so that the application is driven by the output hub of the speed reducer at a predetermined lower speed. Of course, it is important that the driven shaft and the speed reducer hub be substantially in axial alignment and be generally concentric with one another such that the shaft can be readily received within the hub, can be readily coupled to the hub, and such that undue bending moments and reaction forces are not applied to the output hub and to the bearings of the speed reducer, or to the application driven shaft or to its bearings, inasmuch as these moments and forces may result in a reduction in the operating efficiency and service life of both the speed reducer and the application. Also, it is desirable that the shaft be readily capable of both being coupled to and removed from the speed reducer, as required.

In the past, it has been known that sheaves or pulleys can readily be coupled to a respective shaft by means of a tapered, split bushing. However, the length of the shaft received in the sheave hub was relatively short. Examples of such sheave or pulley coupling bushings are shown in U.S. Pat. Nos. 2,331,498, 2,669,471, 3,368,833, 3,677,583, and 4,338,036, and in Australian Pat. No. 121,613.

Even more particularly, the problem of receiving and coupling an application shaft to the output hub or quill of a speed reducer in such manner as to accommodate variations in concentricity and axial alignment of the hub and the output shaft have been addressed in such U.S. Pat. Nos. 2,811,861, 3,590,652, and 4,452,547. However, these prior patents required the use of two tapered bushings and means for drawing the bushings into engagement with the shaft and the quill hub on both sides of the hub, so as to accommodate the longer length of the shaft received in the hub. This necessity of dual tapered bushings resulted in extra parts, material, labor, and cost required to receive and couple the shaft. Also, it required that both sides of the bushing be tightened or loosened for respective coupling and uncoupling of the shaft relative to the hub. These dual tapered bushings required the use of a somewhat longer shaft than was required for the length of the hub receiving them. Also, in removing these dual tapered bushings from the shaft, until one of the bushings was freed from the shaft, the oppositely facing bushings would tend to fight one another during removal because the shaft may become "frozen" to the bushings such that a loosening force on one acts as a tightening force on the other bushing. In an effort to overcome "freezing" of the shaft to the sleeve, a variety of coatings, such as various fluorocarbon resins including polytehafloroethylene (PTFE) and molybdenumdisulfide lubricants, have been used without apparent success. Often times, "wheel puller" tools were required to break the frozen shaft free of the sleeve. Not only was the use of such "wheel puller" tools time consuming, but often times additional lengths of the application shaft were required solely to permit installation of the removal tool on the application side of the hub. Removal of the hub is not an incidental problem because service is periodically required for the bearings of the speed reducer and the application. Also, in installing such dual tapered bushing mounts, the sleeves at both ends of the shaft must be tightened in general unison and uniformly torqued to predetermined torque levels.

In an effort to overcome these above-noted problems with the prior art double tapered bushings, single tapered bushings have been used within shaft mount speed reducers. However, this single tapered shaft extended only about halfway into the quill hub such that only a portion of the driven shaft received within the quill hub was engaged and gripped by the single tapered bushing. Also, this single tapered bushing was provided with external threads at its outer ends which were threadably received within internal threads provided in one end of a quill hub ring. The provision of such threads were expensive and were not entirely satisfactory in facilitating removal of the tapered bushing, particularly when the latter became frozen in the hub or on the application shaft.

Reference may be made to other U.S. Pat. Nos., such as 3,257,070, 3,398,597, and 3,442,559, for other references which may be in the same general field as the present invention.

While all of the above-identified prior references work well for their intended purposes, there has been a long-standing need of an effective method of securing and detaching a shaft to a speed reducer which minimized the number of parts, which accommodated a relatively wide range of misalignment between the shaft and the hub, and which was easier and faster to install and remove than the prior art shaft mounting systems.

SUMMARY OF THE INVENTION

Among the several objects and features of the present invention may be noted the provision of a single tapered bushing for receiving and mounting a shaft which accommodates a relatively wide range of misalignment between the axis of the shaft and the axis of the hub, and which readily accommodates a relatively long length of the shaft received therein;

The provision of such a shaft mount which has a single mounting and coupling system on one side of the bushing for attaching or removing the shaft;

The provision of such a shaft mounting system which ensures that the shaft is securely clamped to the bushing, and which permits the use of a shorter driven shaft (as compared to the length of the shaft required for prior dual tapered mounting bushings) between a speed reducer and its application such that the speed reducer can be mounted in relatively close proximity to its application; and The provision of such a single mount bushing which is less expensive to manufacture, which is of rugged construction, which is easy and fast to install, and which has a long service life.

Other objects and features of this invention will be in part apparent and in part pointed out hereinafter.

Generally stated, a single tapered bushing of the present invention for receiving and mounting a shaft within a bearing assembly is disclosed. The bearing assembly is supported within a housing and comprises a pair of spaced anti-friction bearings, with each of the bearings having an outer race fixed with respect to the housing, an inner race rotatable with respect to its respective outer race, and a plurality of rolling elements therebetween. A rotatable quill member having a hollow hub is provided, this quill member being received by the inner races of the bearings, with the inner races and the hub being generally coaxial and being rotatable as a unit. The hub has a tapered inner bore extending through (or partly through) the hub and converging inwardly from one side of the hub to the other. A single sleeve is provided having a flange at one end thereof, this sleeve having an outer tapered surface converging inwardly from the flange at the one end thereof, and further having a cylindrical inner bore. The sleeve is received within the hub bore with the outer tapered surface of the sleeve contacting the inner tapered hub bore substantially along the full length thereof. A longitudinal slot is provided within the sleeve for permitting circumferential contraction and/or expansion of the sleeve within the tapered hub bore. The inner sleeve bore receives a shaft in such manner as to accommodate variations in axial alignment, within a limited range, between the axis of the shaft and the axis of the hub. Key and slot means is provided for rotatably coupling the shaft and the hub such that the hub and the shaft rotate as a unit. Still further, means is provided for forcefully drawing the sleeve with the shaft received in the bore thereof into the tapered bore of the hub, and for contracting or expanding the sleeve on the shaft so as to accommodate the above-noted misalignment between the shaft and the hub, and to journal the shaft within the hub such that with the sleeve at least partially axially inserted into the hub bore, and with the shaft received by the sleeve, the shaft may be forcefully coupled to the hub and drawn into substantially axial alignment therewith by forcefully drawing the sleeve into the hub bore.

BRIEF DESCRIPTION OF THE DRAWINGS

Corresponding reference characters indicate corresponding parts throughout the several views of the drawings.

DESCRIPTION OF A PREFERRED EMBODIMENT

Figure 2:
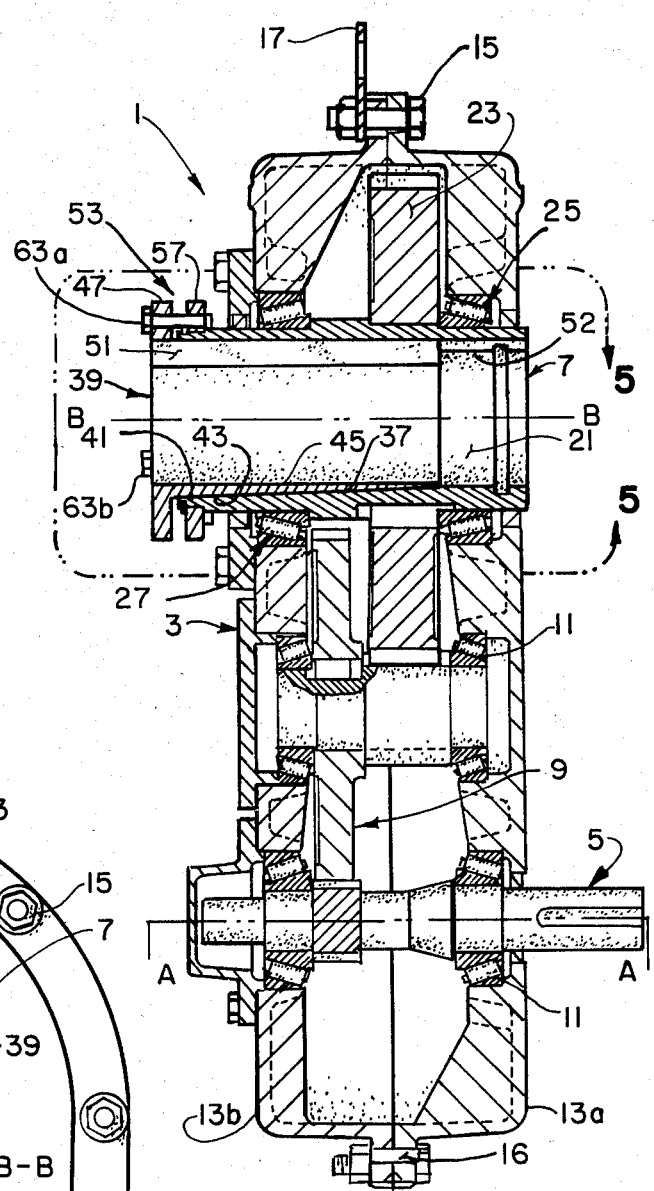
FIG. 2 is a longitudinal cross sectional view of the speed reducer, taken along line 2—2 of FIG. 1.
Figure 1:
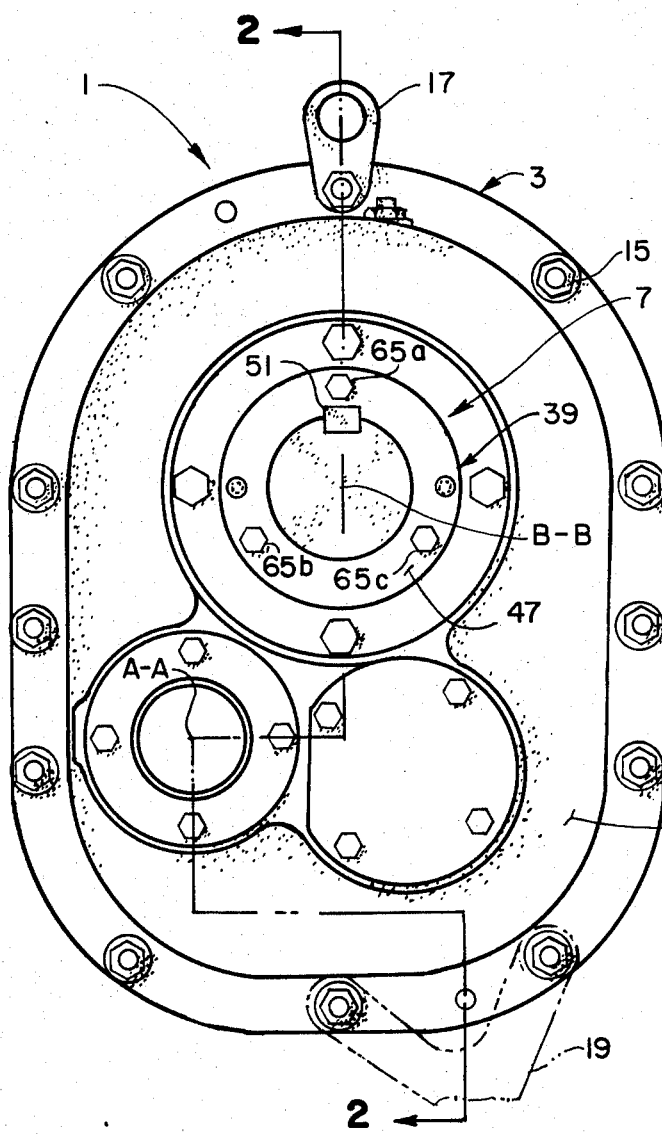
FIG. 1 is a side elevational view of the back side of a shaft mounted double reduction speed reducer incorporating a single tapered bushing shaft mount of the present invention.

Referring now to the drawings, a shaft mounted speed reducer, and more particularly a double reduction shaft mounted speed reducer, is indicated in its entirety by reference character 1. The speed reducer is shown to have a housing 3 and has a power input shaft, as generally indicated at 5, a power output hub or quill, as indicated at 7, with a speed reducing gear train 9 journaled within housing 3 such that the input shaft drives the output quill at a predetermined reduced speed ratio, with a consequent increase in output torque. As is conventional, the input shaft and the various gears comprising the gear train 9 are journaled in respective anti-friction roller bearings or the like, as indicated at 11. Housing 3 is shown to comprise two housing sections, a front section 13a and a back section 13b, bolted together by bolts 15. As is conventional, locating pins 16 accurately locate the housing sections relative to one another such that the various bearings and shafts carried thereby are in axial alignment with respect to one another. Speed reducer 1 is supported by a lug 17 at the top of the housing, and reaction loads are carried and by a yoke 19 at the lower portion of the housing. As is conventional, input shaft 5 is connected to the drive shaft of an electric motor or other prime mover (not shown) by any of several well known means.

As is conventional, it is usually desirable that the output quill 7 receive and be coupled to a driven shaft (not shown) of a particular application (also not shown) to be driven by the above-noted prime mover at a reduced speed, as determined by the speed reduction ratio of speed reducer 1. Because speed reducer 1 is mounted concentrically with respect to the output shaft of the prime mover with its input shaft 5 being generally parallel to the output shaft of the prime mover, it is necessary that output quill 7 be capable of receiving and coupling the driven shaft of the application in such manner that the driven shaft can be readily received within the output quill, and yet such that variations (within a limited range) in axial alignment, parallelism, and angularity between the axis of the output quill, as indicated at B—B, relative to the axis of the driven shaft, can be readily accommodated.

Figure 5:
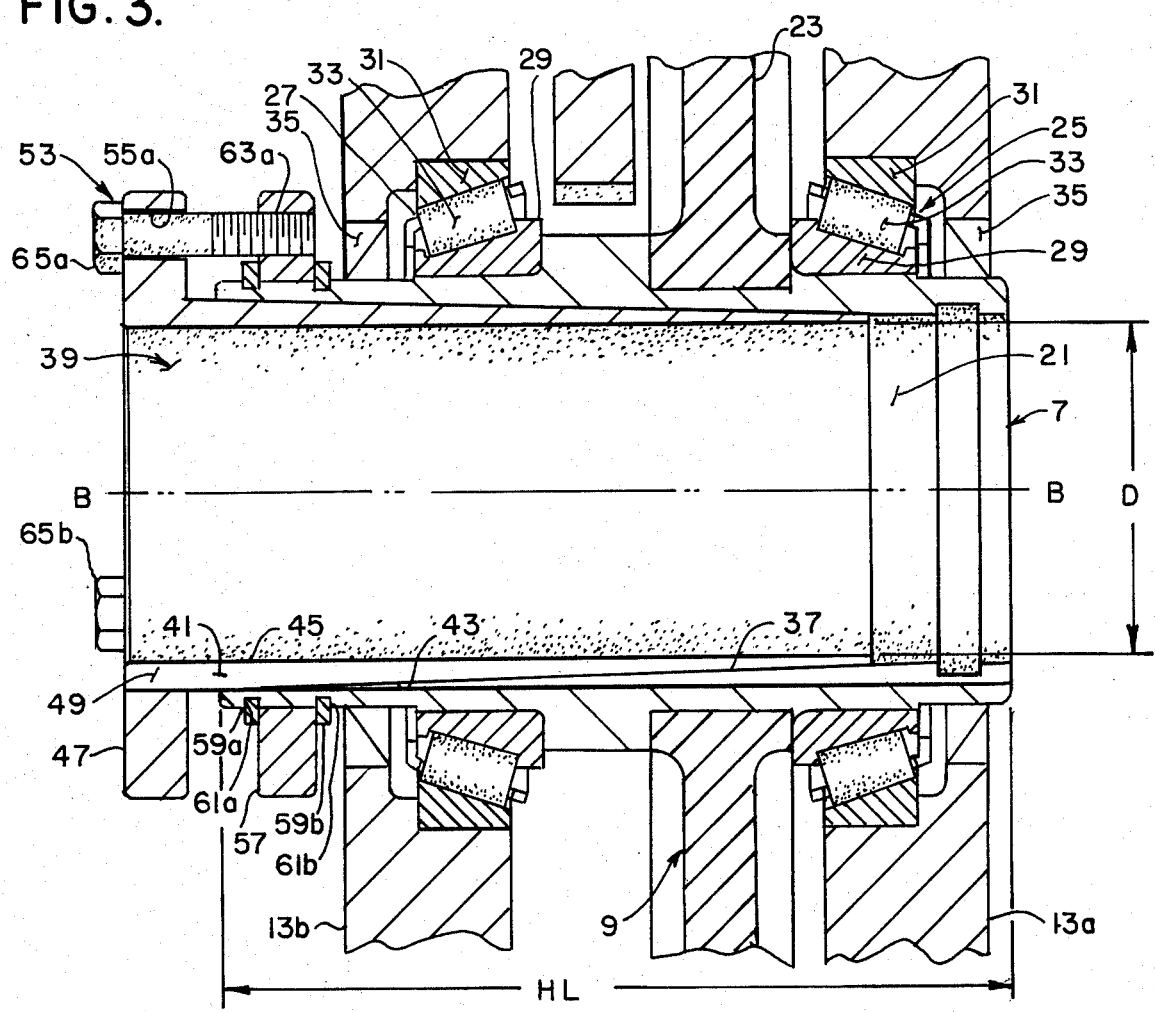
FIG. 5 is a view of a portion of FIG. 2 on an enlarged scale, showing the details of construction of the shaft mount system of the present invention.

Output quill 7 includes a quill hub 21 for mounting and rotatably connecting output gear 23 of gear train 9 thereto. Alternatively, quill 7 and output gear 23 may be of one-piece construction. Quill 7 is journaled by a pair of anti-friction roller bearings, as indicated at 25 and 27, respectively. Each of these bearings is essentially identical and each comprises an inner race 29 which is carried by and secured to the outer surface of quill 7, and an outer race 31 which is received by and secured to an appropriate counterbore or recess within a respective housing section 13a, 13b. A plurality of roller elements 33 are interposed between the inner and outer races such that output quill 7 is free to rotate relative to housing 3. While roller bearings are shown, it will be understood that a variety of other bearings, including ball or other rolling elements, may be utilized within the broader aspects of this invention. As best shown in FIG. 5, seals 35 are provided between housing sections 13a and 13b and the outer ends of quill hub 21 so as to prevent the leakage of lubricant from within housing 3.

Referring now to FIG. 5, quill 7 has a tapered inner bore, as indicated at 37, therewithin converging inwardly relative to axis B—B from one end thereof (i.e., the outboard or back side of the quill, as shown at the lefthand side of FIG. 5), toward the other side of the quill hub. Preferably, this taper is a relatively exaggerated taper (e.g., three-quarter inch per foot taper) for purposes as will hereinafter appear.

As generally indicated at 39, a single piece quill bushing is insertable into taper bore 37 of quill 7 from the one or back side of the quill housing (i.e., the side of the quill housing proximate housing section 13b), the quill bushing has a tapered sleeve 41 having a tapered outer surface 43 and a cylindric bore 45 therethrough. Generally, the taper of tapered sleeve surface 43 matches the taper of taper bore 37 of quill hub 21 such that the taper 43 converges inwardly toward the axial centerline of sleeve 41 from one end (i.e., the back side end) of the tapered sleeve 41 to the other. The taper of tapered surface 43 of sleeve 41 is substantially the same as the taper of the inner tapered bore 37 of quill 7. Preferably, the length SL of sleeve 41 ranges between about 0.65 and 1.00 times the length HL of hub 31, and the diameter D of the inner bore 45 of sleeve 39 ranges between about 0.20 and 0.70 times the length SL of sleeve 39. As shown in FIG. 5, the ratio of sleeve length SL to hub length HL is about 0.73 and the ratio of the diameter D of the inner bore 45 of sleeve 39 to the sleeve length SL is about 0.55. It can be seen that in this manner, sleeve 39 positively engages and grips substantially the full length of the application shaft (not shown) received within quill hub 21 thereby to ensure alignment and securement of the shaft relative to the hub and the sleeve.

An integral flange 47 is provided at one end (i.e., the back side end) of tapered sleeve 41 of quill bushing 39. A key slot 49 extends through a portion of flange 47 and extends lengthwise along tapered sleeve 41 for receiving a square key 51 (as shown in FIG. 2) for positively coupling a driven shaft having a matching key slot therein (not shown) received in hub 21. Hub 21 is provided with a corresponding key slot 52, as shown in FIG. 2, which also receives key 51. In other applications, where the diameter of the application shaft is relatively small, two keys (not shown) may be used in place of key 51. One of these keys connects the shaft to the bushing and the other connects the bushing to the quill.

As generally indicated at 53, means is provided for forceably drawing quill bushing 39 into tapered sleeve-to-tapered bore bearing relation with quill 7 thereby to accommodate variations, at least within a limited range, in axial alignment, parallelism, and angularity between axis B—B of quill hub 21 and the axis of the driven shaft (not shown) received within and coupled to quill 7 by means of quill bushing 39 of the present invention. More specifically, this last-mentioned means is shown to provide a plurality of holes, 55a, 55b, and 55c, disposed within flange 47 at substantially equal angular intervals therearound. A so-called bushing ring 57 is fixedly supported on the outer end of quill hub 21 by means of retainer rings 59a, 59b which are received in respective grooves 61a, 61b in the quill hub so as to positively fix bushing ring 57 in axial direction with respect to the quill hub. Respective threaded apertures 63a-63c are provided in bushing ring 57 in register with respective apertures 55a-55c in flange 47. Respective bolts, as indicated at 65a-65c, are received by respective holes 55a-55c in flange 47. Each bolt 65a-65c is threaded into its respective threaded aperture 61a-61c in bushing ring 57 such that upon tightening the bolts 65a-65c in a generally uniform manner around the bolt pattern, tapered sleeve 41 of quill bushing 39 is forceably drawn into the tapered bore 37 of quill hub 31 (from left to right, as shown in FIG. 5), with the tapered surfaces 37 and 43 of of the quill hub and the tapered sleeve, respectively, being in face-to-face engagement. As indicated at 67, a slot extends lengthwise of sleeve 41 and permits limited circumferential contraction or expansion of the diameter of sleeve 41 as the sleeve is forcefully drawn into the tapered bore 37 of the quill hub thereby accommodating variations in concentricity, angular alignment, and parallelism between the axis B—B of quill hub 21 and the driven shaft (not shown) received within the quill hub and to be coupled therewith via quill bushing 39 and key 51.

In operation, with speed reducer 1 mounted on the output shaft of a prime mover (not shown), and with the output shaft of the prime mover and with input shaft 5 of the speed reducer in substantial coaxial relation, the bore of output quill 21 (axis B—B) is generally aligned with the driven shaft (not shown) of an application, and, with quill bushing 39 loosely received within quill hub 21, the driven shaft of the application is received within the cylindric bore 45 of the tapered sleeve 43. In this position, key 51 is inserted into key slot 49 of the quill bushing, and is also received within the key slot 52 of the quill housing and the key slot (not shown) in the driven shaft of the application (also not shown). Because the diameter of cylindric bore 45 of quill bushing 39 is initially somewhat larger than the diameter of the driven shaft received therewithin, and because the tapered sleeve 43 is initially only loosely received within tapered bore 37 of quill hub 21, the tapered quill bushing 39 is capable of readily receiving the driven shaft therewithin, even in the event there is a substantial amount of axial misalignment of axis B—B of quill hub 21 and the driven shaft, or even though there is a substantial amount of non-parallelism between the shaft and the quill hub, or axial misalignment or skew between the quill hub and the driven shaft. As bolts 65a-65c are tightened, flange 47 of quill hub 39 is drawn toward bushing ring 57, thus forceably drawing tapered sleeve 41 into tapered bore 37 of the quill hub. Due to the wedging action of the outer tapered sleeve 43 being forced into the tapered bore 37 of quill hub 21, slot 67 extending lengthwise of sleeve 41 permits contraction (or expansion) of the tapered sleeve around the driven shaft received therewithin, such that a tight, clamping action is applied to the outer surface of the driven shaft (not shown) received within cylindric bore 45 of the tapered sleeve, and such that key 51 is received within key slot 49 within sleeve 41, and is positively interconnected by the key slot 52 in quill bushing 49 and by the matching key slot (not shown) in the driven shaft (also not shown). Because the taper of inner quill bore 37 and outer sleeve surface 43 is relatively shallow (e.g., three-quarter inch per foot), axial movement of the tapered sleeve 39 into tapered bore 37 of quill 51, as effected by tightening of bolts 65a-65c, causes contraction of split tapered sleeve 41 onto the outer surface of the application shaft and thus readily accommodates normal variations in axial alignment, concentricity and/or parallelism between quill hub 21 and the driven application shaft.

It is further noted in FIG. 5 that tapered sleeve 41 extends substantially the full length of quill hub 21 such that the sleeve 41 grips substantially the full length of the driven shaft received within quill hub 21. Because of the relatively long length of sleeve 41 relative to the length of quill hub 21, it has been found that only a single tapered bushing is required, and only a single set of bolts 65a–65c are required for positively drawing the single tapered sleeve into quill hub 21.

Figure 3:
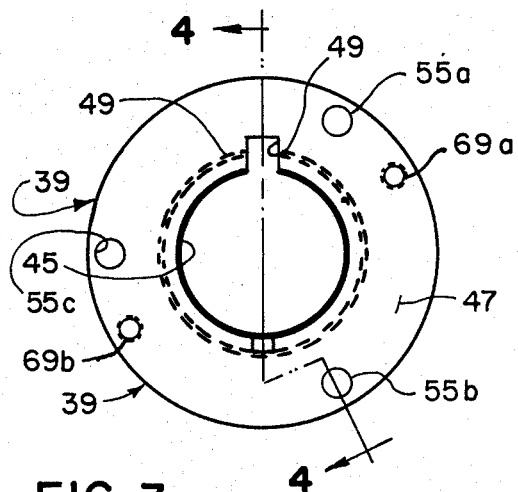
FIG. 3 is an end view of a single tapered bushing utilized in the shaft mount system of the present invention.
Figure 4:
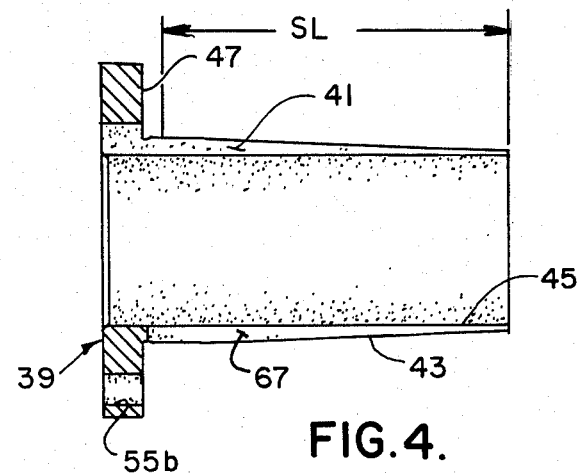
FIG. 4 is a cross sectional view, taken along line 4—4 of FIG. 3.

Referring now to FIG. 3, it will be noted that two or more diametrically opposed threaded apertures, as indicated at 69a, 69b, are provided for receiving other threaded fasteners or bolts (not shown). Threaded aperture 69a, 69b are disposed in flange 47 such that the ends of the bolts threaded thereinto will bear against the outer face of bushing ring 57. Thus, with bolts 65a–65c loosened, and upon tightening of the bolts threadably received in threaded apertures 69a–69b, quill hub 21 is forcefully pushed axially outwardly off of quill bushing 39 thereby to facilitate uncoupling of the driven shaft relative to the quill bushing.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. A single tapered bushing system for receiving and mounting a shaft within a bearing assembly, said bearing assembly being supported within a housing and comprising a pair of spaced anti-friction bearings, each said bearing having an outer race fixed with respect to said housing, and an inner race rotatable with respect to said outer race, a plurality of rolling elements disposed between said inner and outer races, a rotatable member having a hollow hub open at both ends thereof, said hub being received by the inner races of said bearings with said inner races of said bearings and said hub being generally coaxial and with the inner races and with said hub being rotatable relative to said outer races and said housing, said hub having a tapered inner bore extending substantially through said hub and converging inwardly from one open end of the hub to the other, a single sleeve having a flange at one end thereof, said sleeve having an outer tapered surface converging inwardly from said flange at said one end thereof and further having a cylindrical inner bore, said sleeve being received within said hub bore from said one open end of said hub with the outer tapered surface of said sleeve contacting said tapered hub bore substantially along the full length thereof, a longitudinal slot in said sleeve for permitting circumferential contraction and/or expansion of said sleeve within said hub bore, said inner sleeve bore receiving a shaft in such manner as to accommodate variations in axial alignment, concentricity, and/or parallelism, within a limited range, between the axis of said shaft and the axis of said hub, means for rotatably coupling said shaft and said hub such that said hub and said shaft rotate as a unit, and means for forceably drawing said sleeve with said shaft received in the bore thereof into said tapered bore of said hub thereby to effect contraction or expansion of said sleeve on said shaft so as to accommodate said variations between said shaft and said hub, and for positively coupling said shaft and said hub.

2. A bushing system as set forth in claim 1 wherein said means at only one end of said sleeve for forceably drawing said sleeve into said hub comprises a flange carried by said hub at said one side thereof, and a plurality of threaded fasteners carried by said sleeve flange and threadably received in said hub flange such that by turning said fasteners, said sleeve may be forceably drawn into said hub bore from said one side thereof.

3. A single-tapered bushing system as set forth in claim 2 further comprising means at only one end of said sleeve for forceably pushing said hub bore axially off of said sleeve thereby to permit uncoupling of said shaft relative to said hub.

4. A single tapered bushing system as set forth in claim 1 wherein the length of said sleeve ranges between about 0.65–1.00 times the length of said hub.

5. A single tapered bushing as set forth in claim 4 wherein the diameter of said hub bore ranges between about 0.20–0.70 times the length of said sleeve.

6. A single tapered bushing system as set forth in claim 1 wherein said sleeve flange is a solid flange free of said slot in said sleeve extending radially outwardly through said flange from the bore through the outer edge of said flange.

* * * * *